US011788790B2

(12) United States Patent
Hopkins et al.

(10) Patent No.: US 11,788,790 B2
(45) Date of Patent: Oct. 17, 2023

(54) LOW ENERGY DRYING OF SWINE LAGOON SLUDGE OR DIGESTATE

(71) Applicant: North Carolina State University, Raleigh, NC (US)

(72) Inventors: Christopher B. Hopkins, Raleigh, NC (US); Joseph L. Stuckey, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/797,742

(22) Filed: Feb. 21, 2020

(65) Prior Publication Data

US 2020/0271383 A1 Aug. 27, 2020

Related U.S. Application Data

(60) Provisional application No. 62/808,553, filed on Feb. 21, 2019.

(51) Int. Cl.
*F26B 17/04* (2006.01)
*C05F 7/00* (2006.01)
(Continued)

(52) U.S. Cl.
CPC .............. *F26B 17/045* (2013.01); *C05F 3/06* (2013.01); *C05F 5/002* (2013.01); *C05F 7/00* (2013.01); *C05G 5/12* (2020.02); *C10L 5/42* (2013.01); *C10L 5/442* (2013.01); *C10L 5/445* (2013.01); *C10L 5/46* (2013.01); *C10L 5/48* (2013.01); *C10L 9/00* (2013.01); *F26B 17/023* (2013.01);
(Continued)

(58) Field of Classification Search
None
See application file for complete search history.

(56) References Cited

U.S. PATENT DOCUMENTS 2,657,031 A * 10/1953 Tomlinson .............. F26B 17/04
432/74
3,307,270 A * 3/1967 Kruger ..................... A23B 9/08
34/368
(Continued)

OTHER PUBLICATIONS

Deutsch, "A Burning Answer for Manure," National Hog Farmer, Sep. 15, 2007. https://www.nationalhogfarmer.com/mag/burning_answer_manure.
(Continued)

*Primary Examiner* — Wayne A Langel
(74) *Attorney, Agent, or Firm* — Jenkins, Taylor & Hunt, P.A.

(57) ABSTRACT

Devices, systems, and methods for drying a bulk waste product, such as animal waste, having a moisture content of 95% or more water can include a trough configured to receive the bulk waste product and to dispense it in a form suitable for convective drying, one or more conveyors having an air-permeable conveyor belt, each conveyor receiving the waste product from the trough and transporting the waste product along a transport path; and one or more air moving devices (AMDs) that pass air through the air-permeable conveyor belt and across the waste product as it is transported along the transport path to transform the bulk waste product into a dried waste product having a moisture content of about 5% to about 20%, inclusive.

20 Claims, 10 Drawing Sheets

(51) Int. Cl.
    *C05F 5/00*     (2006.01)
    *C05G 5/12*     (2020.01)
    *C10L 5/42*     (2006.01)
    *C10L 5/44*     (2006.01)
    *C10L 5/46*     (2006.01)
    *C10L 5/48*     (2006.01)
    *C10L 9/00*     (2006.01)
    *F26B 17/02*     (2006.01)
    *C05F 3/06*     (2006.01)

(52) U.S. Cl.
    CPC ... *C10L 2200/0469* (2013.01); *C10L 2290/08* (2013.01); *F26B 2200/02* (2013.01); *F26B 2200/18* (2013.01)

(56) References Cited

U.S. PATENT DOCUMENTS

| | | | | |
|---|---|---|---|---|
| 3,352,025 A * | 11/1967 | James | ............ | F26B 17/04 34/212 |
| 4,316,718 A * | 2/1982 | Drugge | ............ | F26B 17/04 432/58 |
| 4,823,479 A * | 4/1989 | Dornier | ............ | F26B 7/00 34/210 |
| 5,373,647 A * | 12/1994 | Bernes | ............ | C02F 11/13 34/382 |
| 5,384,969 A * | 1/1995 | Troetscher | ............ | F26B 17/04 34/236 |
| 5,862,609 A * | 1/1999 | Stevens | ............ | F26B 21/086 34/363 |
| 5,913,590 A * | 6/1999 | Backus | ............ | F26B 17/24 34/401 |
| 9,341,410 B1 * | 5/2016 | Griffin | ............ | F26B 17/04 |
| 2002/0152631 A1 * | 10/2002 | Knoer | ............ | F26B 17/04 34/216 |
| 2017/0328635 A1 * | 11/2017 | Kreuzer | ............ | F26B 13/12 |
| 2018/0086861 A1 * | 3/2018 | Grunewald | ............ | F26B 21/02 |
| 2020/0085085 A1 * | 3/2020 | Reed | ............ | F26B 25/066 |
| 2020/0196532 A1 * | 6/2020 | Koch | ............ | F26B 3/06 |
| 2022/0390174 A1 | 12/2022 | Hopkins et al. | | |

OTHER PUBLICATIONS

Notice of Publication to U.S. Appl. No. 17/834,605 dated Dec. 8, 2022.

* cited by examiner

LOW ENERGY DRYING OF SWINE LAGOON SLUDGE OR DIGESTATE

CROSS-REFERENCE TO RELATED APPLICATION

This application claims benefit of U.S. Provisional Patent Application Ser. No. 62/808,553, filed Feb. 21, 2019, the disclosure of which is incorporated by reference herein in its entirety.

TECHNICAL FIELD

The subject matter disclosed herein generally relates to the treatment and disposal of waste products. More particularly, the subject matter disclosed herein relates to air drying biological waste products having a high water content using a low amount of energy.

BACKGROUND

The storage, handling and effective utilization of animal waste is an ongoing challenge for animal agricultural industries, particularly in concentrated animal feeding operations (CAFOs). The swine and poultry industries, for example, produce a significant amount of animal waste that must be properly handled and utilized to ensure profitability and environmental sustainability. Such efforts are important, particularly where CAFOs are prevalent in large numbers in states such as North Carolina and Iowa.

Legislative efforts, both federally and at the state level, set forth environmental regulations as well as incentives to develop alternative and productive uses for animal waste. Incentives are in place to effectively utilize animal waste as an energy source in North Carolina.

For example, the Renewable Energy and Energy Efficiency Portfolio Standard (REPS) requires that North Carolina power companies provide approximately 30 MW of electrical capacity from swine waste by 2021. The fuel source for this power was originally foreseen to be methane from anaerobically digested pig feces. However, currently, North Carolina power producers have struggled to meet this target and are currently producing about 5 MW (2018) of their targeted 30 MW (2021). Clearly the anaerobic pathway to energy production is insufficient to produce this target give current incentives.

Moreover, regulations require that nutrients within animal waste must be utilized properly to minimize potential negative environmental impacts. For example, application of animal waste to land must be carefully controlled and monitored to avoid over-application of any particular nutrient.

Thus, there remains a significant need for alternative pathways and approaches to effectively manage and utilize animal waste, including converting animal waste into usable energy. Disclosed herein are novel systems, devices and methods to address the ongoing need to effectively utilize swine waste (and other animal waste) for other purposes, thereby addressing address these long-felt needs. The disclosed systems, devices and methods overcome the crusting problem (e.g., water retention) associated with stored lagoon solids/digestate and produce a dried solid fuel/fertilizer at low expense from both digestate and lagoon solids. In some embodiments, the disclosed systems, devices and methods utilize drying belt technologies and/or a combination of extrusion and drying belt technologies using air for drying.

SUMMARY

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

In a first example embodiment, a waste drying system is provided, the system comprising a trough configured to receive a bulk waste product and to dispense the waste product in a form suitable for convective drying; one or more conveyors having an air-permeable conveyor belt, each conveyor being configured to receive the waste product from the trough and transport the waste product along a path from a first end of the system to a second end of the system; and one or more air moving devices (AMDs) configured to pass air through the air-permeable conveyor belt and across the waste product as the waste product is transported on the air-permeable conveyor belt along the path from the first end of the system to the second end of the system; wherein, after the waste product has been transported to the second end of the system, the waste product is transformed into a dried waste product having a moisture content of about 5% to about 20%, inclusive.

In some embodiments of the system, the trough comprises a hopper configured to receive the bulk waste product and an extruder configured to extrude the bulk waste product into an extruded waste product, optionally wherein the extruder further comprises a series of extrusion ports in at least one side of the hopper, and a rotatable member with one or more paddles configured to rotate about an axis and force the bulk waste product through the series of extrusion ports or wherein the extruder comprises a screw style in tube.

In some embodiments of the system, the extruder extends transversely along one end of the air-permeable conveyor belt and extends substantially across a width thereof.

In some embodiments of the system, the extruder is configured to continuously extrude the bulk waste product contained within the hopper onto the air-permeable conveyor belt in a substantially even layer while the air-permeable conveyor belt is in motion.

In some embodiments of the system, the air-permeable conveyor belt comprises a mesh, metal, fabric, textile, chain, interlocking, or otherwise linked material with sufficient rigidity to hold and transport the extruded waste product on an upper surface thereof, while being sufficiently flexible or bendable to track along a continuous revolving path.

In some embodiments of the system, the air-permeable conveyor belt comprises a metal, metal alloy, fabric or textile, plastic, composite, or other suitable material.

In some embodiments of the system, the air-permeable conveyor belt comprises a plurality of perforations, holes, or openings extending from a lower surface of the air-permeable conveyor belt to an upper surface of the air-permeable conveyor belt, the perforations, holes, and/or openings being sufficiently large to allow air from the one or more AMDs to pass through the perforations, holes, or openings and contact the extruded waste product transported thereon.

In some embodiments of the system, the one or more AMDs are positioned proximate to and/or below the air-permeable conveyor belt of the one or more conveyors, wherein the one or more AMDs are configured to pull air from an external environment and blow the air through the air-permeable conveyor belt associated therewith, such that a flow of air contacts the waste product on the surface of the air-permeable conveyor belt.

In some embodiments of the system, the trough, the air-permeable conveyor belt of the one or more conveyors, and the one or more AMDs are powered by one or more electric motors or other suitable power source sufficient to provide power to each, wherein the one or more electric motors are controlled by a controller configured to simultaneously control each of the one or more electric motors such that each of the trough, the air-permeable conveyor belt of the one or more conveyors, and the one or more AMDs are configured for simultaneous operation.

In some embodiments, the system comprises a housing comprising a first opening and a second opening, wherein the one or more AMDs are mounted in the first opening, wherein the air-permeable conveyor belt is positioned in the second opening, and wherein the housing is configured to direct an airflow from the one or more AMDs in the first opening through the air-permeable conveyor belt positioned in the second opening.

In some embodiments of the system, the one or more conveyors comprises a first conveyor and second conveyor and wherein the one or more AMDs comprises a first AMD and a second AMD, the system comprising: a first drying stage comprising the first conveyor and the first AMD; a second drying stage comprising the second conveyor and the second AMD; and a controller configured to simultaneously and independently control the first and second drying stages to coordinate a transport speed of the waste product along the air-permeable conveyor belt of the first and second conveyors, respectively, as well as a flow of air produced by each of the first and second AMDs.

In some embodiments of the system, the first conveyor comprises a physical agitator configured to remove a partially dried waste product from the air-permeable conveyor belt of the first conveyor, such that the partially dried waste product accumulates on a transport belt configured to transport the partially dried waste product from the first conveyor to the second conveyor.

In some embodiments of the system, the air-permeable conveyor belt of the second conveyor is configured to advance at a slower rate of speed than the air-permeable conveyor belt of the first conveyor, such that the partially dried extruded waste product accumulates on the air-permeable conveyor belt of the second conveyor at a thicker depth than a depth of the waste product on the air-permeable conveyor belt of the first conveyor.

In some embodiments, the system comprises a receptacle at the second end of the system, wherein the receptacle is configured to collect a dried waste product.

In a second example embodiment, a method of processing and drying a waste product is disclosed, the method comprising: providing a waste drying system as disclosed elsewhere herein; providing the bulk waste product into the trough; dispensing the bulk waste product over the air-permeable conveyor belt of a first conveyor of the one or more conveyors; transporting the waste product along the air-permeable conveyor belt of the first conveyor; passing air through the air-permeable conveyor belt of the first conveyor while the waste product is being transported along the air-permeable conveyor belt of the first conveyor; and reducing a moisture content of the bulk waste product to produce a dried waste product.

In some embodiments of the method, the waste product comprises lagoon sludge, swine waste, poultry litter, dairy waste, manure, and/or other animal waste.

In some embodiments, the method comprises, before providing the bulk waste product into the trough, adding a bulking agent to the bulk waste product, wherein the bulking agent comprises one or more of previously dried waste product (e.g., sludge), agricultural waste, tobacco processing waste, wood manufacturing residue waste, poultry/broiler litter, and/or combinations thereof.

In some embodiments of the method, the dried waste product comprises a moisture content of about 5% to about 20%, inclusive.

In a third example embodiment, a dry waste product produced by the method as disclosed elsewhere herein, wherein the dry waste product is in a form of pellets, dust, nodules, and/or flakes.

In some embodiments, the dry waste product comprises one or more waste products selected from swine waste, poultry waste, tobacco processing waste, wood manufacturing residue waste, lagoon sludge, lagoon digestate, cotton gin trash, food waste, and a combination thereof, wherein the dry waste product has a moisture content of about 5% to about 20%, inclusive.

In some embodiments of the dry waste product, the dry waste product is configured for use as an energy source, a combustible fuel, and/or a fertilizer.

In some embodiments, the presently disclosed systems do not rely on extrusion and can accept a low solids content sludge, such as an 8-15% sludge. In some embodiments, the product is a fine granule. In some aspects, this embodiment can afford additional opportunities for automation In some embodiments, bagged sludge can be extruded into a noodle or tubular structure to increase surface area. This can provide for a faster and more efficient drying process, and can also provide favorable material handling characteristics. By way of example and not limitation, moisture can be reduced from 80% to 15% using the disclosed systems, devices, and methods. Moreover, there is no processing or additional preparation of the raw material, e.g., bagged sludge or lagoon sludge, before applying the raw material to the disclosed systems and devices to extrude the product, i.e. it can be taken directly from the bag or lagoon and applied to the systems and devices disclosed herein.

DETAILED DESCRIPTION

Figure 1:
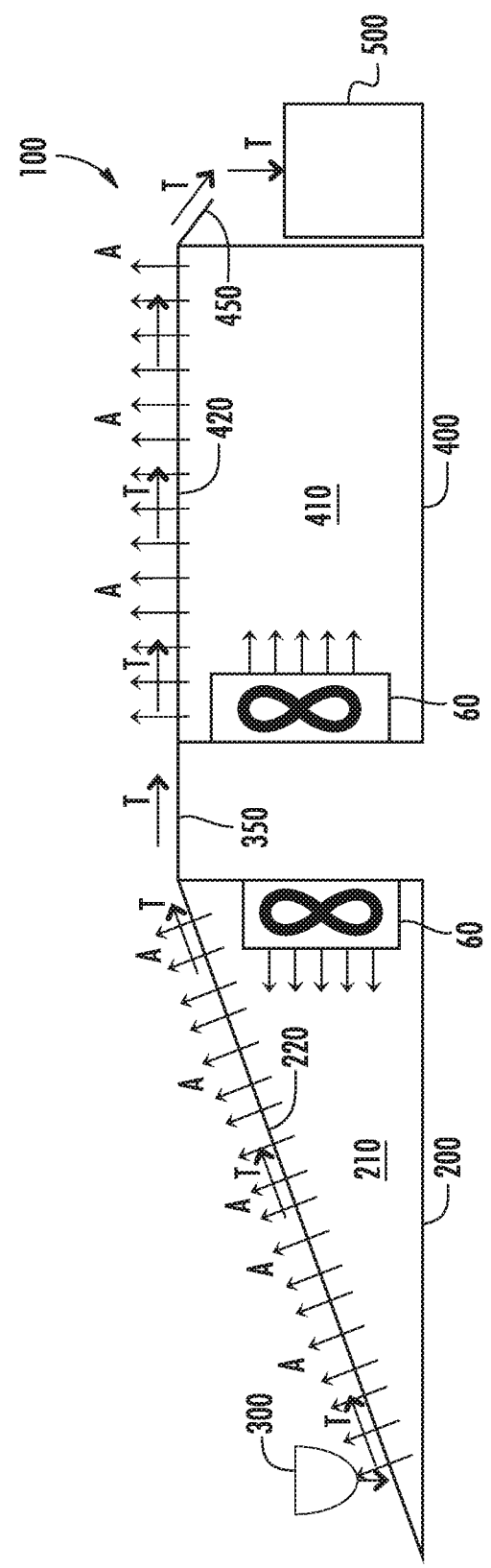
FIG. 1 is a schematic side view of a first example embodiment of a system for drying a waste product to reduce the water content thereof.

The example disclosed lagoon waste processing systems, devices, and methods disclosed herein can in some embodiments comprise one or more, or a series of, troughs, conveyor belts and/or forced air systems, which together can be configured to convert a waste product (e.g., lagoon sludge or other suitable waste material, such as animal waste) into a dried product, which can be, in some embodiments, an extruded and dried product. In some embodiments, a waste processing system as disclosed herein can be referred to as a system to dry and pelletize lagoon waste, a swine waste drying system, a drying system, an extrusion and drying system, etc. Such systems can, in some embodiments, comprise one or more extruders, a series of conveyors and/or a plurality of forced air components, which, together, provide a mechanism for converting a waste product having a moisture content of about 50% to about 95%, inclusive, into a dried product, which can be pelletized or in a form of a powder, having a moisture content of about 5 to about 20%, inclusive. By efficiently drying and forming the waste product into a desired form-factor, the waste product is more readily transportable, storable, and usable for value-added applications.

By way of example, lagoon sludge, sludge waste, lagoon waste, animal waste, etc., also collectively referred to as the waste product, and particularly that waste product suitable for use and/or processing in the disclosed systems, devices, and methods, can have, in an unprocessed state, a moisture content of about 50% to about 95%, inclusive, about 60% to about 90%, inclusive, or about 70% to about 85%, inclusive. In contrast, the dried product produced by the disclosed systems, devices, and methods, can have a moisture content of about 1% to about 25%, or about 5% to about 15%. In some embodiments, such as where the waste product comprises solids dredged from an animal waste lagoon, such lagoon sludge solids can be about 4.5-7% solids as dredged, with the remainder being aqueous material. In some embodiments, this waste product having a low solid content can be bulked up and/or dewatered before drying, or extrusion and drying, using one or more of the disclosed systems, devices, and methods. In some aspects, previously dried waste product (e.g., sludge) can be back-fed and mixed with the unprocessed (e.g., wet) waste product for bulking the unprocessed waste product to have a sufficient concentration of solids to allow for extrusion thereof into the elongated (e.g., noodle-like) structures disclosed elsewhere herein. In some aspects, agricultural or other organic waste can be used for bulking, including, for example, tobacco processing waste, wood manufacturing residue waste, poultry/broiler litter, etc. Any combination of the bulking agents described hereinabove, including the previously dried waste product, may be used without deviating from the scope of the disclosure herein.

The disclosed systems, devices and methods can in some embodiments solve the acute problem of lagoon solids disposal by turning a waste into a valuable product. In some embodiments, the disclosed systems, devices, and methods achieve these results in a way that is portable, thereby eliminating the cost of wet waste transport, and that is low energy input, so it does not require a supplemental heat source. One additional advantage to these systems, devices and methods is that they can be configured to utilize anaerobic digestate. Moreover, in some embodiments, a dry product produced by the disclosed systems, devices, and methods can comprise a pellet appropriate for direct fertilizer application, or for combustion for power and subsequent use as a mineral nutrient supplement or fertilizer.

Another advantage of the disclosed systems, devices, and methods, includes, but is not limited to, the ability to deploy the disclosed drying devices and systems on-site, i.e. at the location of the animal waste. Moreover, the disclosed drying devices and systems can in some embodiments be configured to be mobile or transportable such that they can also be transported to different locations depending on need. Still yet, in some aspects, the disclosed drying devices and systems can produce or create dry waste products that can be easily transported for utilization as fertilizer, energy sources, or other end uses.

Further advantages of the disclosed systems, devices, and methods are low energy consumption via the omission of any heating element for drying the waste product, except in circumstances where rapid drying may be necessary and/or advantageous (e.g., to remove waste from a lagoon in advance of a hurricane or other weather event that would likely cause environmental damage if the lagoon were to become overfilled and run into surrounding water systems). Additionally, it is advantageous that the systems, devices, and methods disclosed herein do not need, but can tolerate, any additives (e.g., chemical, polymeric, and the like) in the waste product before it is dried according to the systems, devices, and methods disclosed herein. Another advantage to the systems, devices, and methods disclosed herein is that such systems can be mobile, to varying degrees as disclosed in greater detail elsewhere herein, and can be deployed to the location where the waste product is located, rather than transporting the unprocessed waste product, containing ~80% or more water that is to be substantially removed, to the system. It should be noted, however, that transportation of the unprocessed waste product to a central location where such systems as disclosed herein are fixed and where such methods as disclosed herein are implemented, is also contemplated herein.

Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. While the following terms are believed to be well understood by one of ordinary skill in the art, the following definitions are set forth to facilitate explanation of the presently disclosed subject matter.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a component" includes a plurality of such components, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C and D.

General Considerations

Hog waste is generally removed from hog barns by flushing the waste into an adjacent lagoon. In North Carolina, new lagoon construction has been banned in favor of environmentally superior technologies by the 2007 Swine Farm Performance Standards Bill. Nonetheless, existing lagoon operations continue under this and subsequent legislation. Lagoons continue to operate, and many have exceeded their anticipated 20-year lifetime capacity of waste storage of sludge. Such lagoons are monitored annually for sludge volume and at approximately ⅛th of total volume they are deemed full, with the requirement that operators file a plan to reduce the sludge capacity. It is not known when a large number of farms will be required to remove sludge from lagoons deemed at capacity, though it is believed it will be imminently.

At present, swine lagoon sludge is removed by pumping out a mixture of waste solids (e.g., sludge) and top water from the lagoon and combining the material extracted with a plastic polymer (4% mix on dry basis) to allow the water and solid fractions to separate. The solids are about 20% dry matter and 80% water. This viscous polymer-sludge mixture is then stored above-ground in large fabric tubes or bags.

If dried, this polymer treated material may be a suitable fertilizer, however, as contained in the bags, the high water content makes it an expensive material to transport and apply over arable land. Furthermore, when the composition of hog waste and polymer is exposed to the air, it will dry on the surface, thereby acting to seal in moisture. This crusting characteristic is especially important when treated lagoon sludge is stored in large containers, since the material will dry at the surface, but the interior will retain a high moisture content virtually indefinitely. Moreover, the costs associated with the polymer material, as well as the pumping, mixing and storage used in such systems are all very high.

A less frequently implemented approach to treating hog waste flushed from a barn is to anaerobically digest the waste. An enclosed tank or covered lagoon is used to digest the material and produce methane that is either flared (burned) or used to generate power. The remaining biomass, or digestate, is either further processed and stored in a lagoon or concentrated and stored similarly to lagoon sludge, i.e. in an above-ground container or tube. In some instances, lagoon solids may be considered a more completely digested swine waste product than the anaerobically produced digestate. The lagoon solids at the bottom of a lagoon are about 50% mineral content on a dry basis while the digestate (leftover material from anaerobic digestion) is about 17% mineral content. The energy content of the dried lagoon solids is about 5,100 BTU/lb, while that of the digestate is 7,900 BTU/lb. The sludge from the bottom of a lagoon and the digestate (leftover material from anaerobic digestion) are also similar in that they will crust over and contain the polymer used for water separation.

The ash remaining from combusted lagoon solids or digestate can be a valuable fertilizer or feed supplement. Its value as a mineral feed supplement for swine may be as high as $500 per ton, and as a mineral fertilizer it may be worth $200-400 per ton. While its value as a fertilizer will likely exceed any value it has as a fuel source, the use thereof as a fuel source is not excluded from the subject matter disclosed herein.

Example Embodiments

Figure 2:
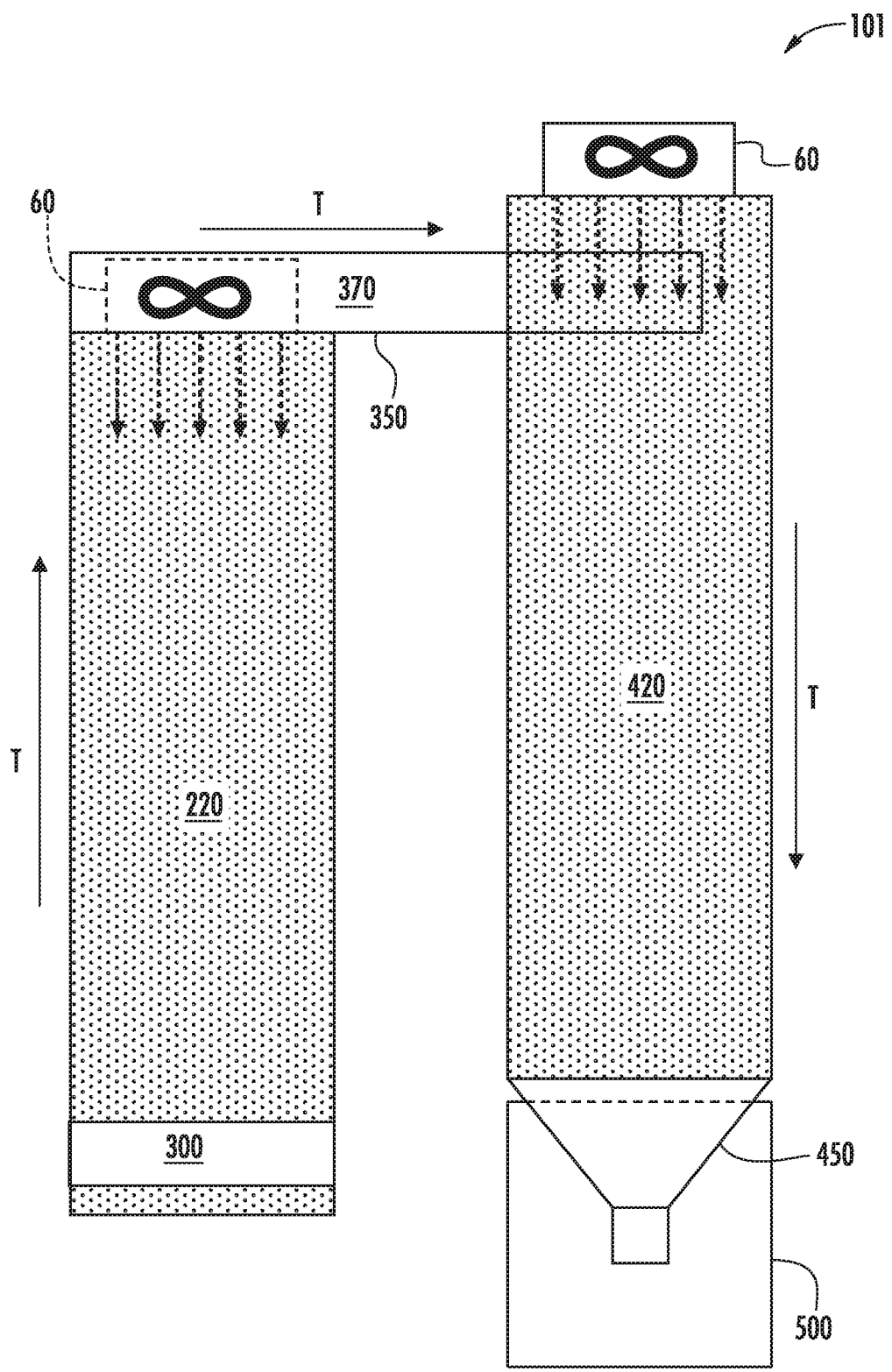
FIG. 2 is a schematic top view of an alternate arrangement of the system of FIG. 1, in which the components of the system of FIG. 1 are arranged in a U-shaped configuration.

FIG. 1 shows a first example embodiment of a waste processing system, generally designated 100. FIG. 2 shows an alternate configuration for the waste processing system of FIG. 1, with the system of FIG. 2 being generally designated 101. In both embodiments, each system 100, 101 comprises a first conveyor 200, an extruder 300 to extrude unprocessed waste product onto the first conveyor 200, a second conveyor 400, a transport conveyor 350 that receives the waste product in a partially processed state from the first conveyor 200 and deposits the partially processed waste product onto the second conveyor 500, and a receptacle 500 into which the fully processed waste product (e.g., the "dried product") is deposited when the waste product is fully dried while moving along the second conveyor 400. The receptacle 500 can comprise a collection bin, container, or any suitable vessel at the end of the second conveyor 400, the receptacle 500 being configured to collect a dried extruded waste product from the second conveyor 400.

The first conveyor 200 comprises one or more air-permeable conveyor belts 220 that are supported by a housing 210. The housing 210 is shown as being inclined in the example embodiment of FIGS. 1 and 2 so that the waste product can be raised to a height above the transport conveyor 350 and the second conveyor 400, such that the waste product can be transferred between the first conveyor 200 and the transport conveyor 350, and between the transport conveyor 350 and the second conveyor 400, using gravity and physical agitation, if necessary, to remove the waste product from the first conveyor 200 and/or the transport conveyor 350, as the case may be. The air-permeable conveyor belt 220 defines a transport surface along which the waste product is transported in the transport direction T, from the extruder 300 to the transport conveyor 350.

The air-permeable conveyor belt 220 can be of substantially any suitably porous material and construction. In some embodiments, the air-permeable conveyor belt 220 comprises a mesh, chain, interlocking, or otherwise linked material with sufficient rigidity to hold and transport the waste product 10 on an upper surface thereof, while being sufficiently flexible or bendable to track, or move, along a continuous revolving path. By way of example and not limitation, the air-permeable conveyor belt 220 can comprise a metal, metal alloy, plastic, composite material, woven material, combinations thereof, or any other suitable material. In some aspects, the air-permeable conveyor belt 220 comprises a plurality of perforations, holes, or openings extending from a lower surface of the air-permeable conveyor belt 220 to an upper surface of the air-permeable conveyor belt 220, wherein the perforations, holes, and/or openings are sufficiently large to allow airflow from one or more air moving devices (AMD) 60 (e.g., blowers or fans) of the first conveyor 200 to pass through the perforations, holes, and/or openings and contact the extruded waste product 10 being transported thereon.

The one or more AMDs 60 force air, generally in the direction indicated by the plurality of arrows A, through the openings in the air-permeable conveyor belt 220 on which the waste product 10 is deposited by the extruder 300. In any embodiments of the disclosed subject matter, the direction of the air flow may be reversed from the orientation shown, such that, instead of air flow being blown into the frames 210, 410 of the first and second conveyors 200, 400, respectively, the AMDs 60 will pull air out of the frames 210, 410 to create a low pressure therein, thereby causing the flow of air through the waste product on the air-permeable conveyor belts 220, 420 to pass from the ambient environment and into the frame 210, 410 by passing through a corresponding one of the air-permeable conveyor belts 220, 420. Such an arrangement can be advantageous in some aspects because there is a reduced risk that the waste product will be dislodged and/or blown off of the air-permeable conveyor belt 220, 420 by an air flow passing into the frame 210, 410 through the air-permeable conveyor belt 220, 420 than for the air flow directions shown in the example embodiments disclosed and discussed herein. Regardless of the direction of the air flow, the air flow dries the extruded waste product 10 due to contact with this air flow as the waste product 10 is transported along the first conveyor 200. As such, air flow is exhausted from within the housing 210 of the first conveyor 200 through the air-permeable conveyor belt 220 along substantially the entire length of the air-permeable conveyor belt 220, or at least from a point between where the waste product 10 is deposited on the air-permeable conveyor belt 200 by the extruder 300 and the end of the air-permeable conveyor belt 220, adjacent the transport conveyor 350. As used herein, while the air-permeable conveyor belt 220 is of a type of so-called endless conveyor, which is wrapped around, supported by, and/or driven by, a plurality of rollers (e.g., with or without gears attached thereto), the "ends" of the air-permeable conveyor belt 220 are considered to be the positions adjacent to the first and last rollers in the direction of travel T.

In some aspects of the system 100, 101, the housing 210 of the first conveyor 200 is in the form of a substantially enclosed housing, other than a majority of, or substantially all of, the surface along which the air-permeable conveyor belt 220 moves, which defines a first opening. The housing 210 has a second opening formed therein as well, the second opening being located at the end thereof where the height of the housing 210 is the greatest to allow for a large AMD 60 to generate a sufficient air flow, however, the second opening and the AMD 60 may be located at any suitable location on the housing 210 to allow the AMD to be of sufficient size to generate a sufficient air flow to produce a desired moisture reduction of the waste product 10 as it is transported in the transport direction T. The AMD 60 may be mounted internal to, external from, or partially internal and partially external to the housing 210 and may advantageously be substantially sealed against the second opening to reduce air flow leakages therethrough. The surface along which the air-permeable conveyor belt 220 moves is positioned within the first opening and the housing 210 is configured to direct an air flow, designated in FIG. 2 by the arrows A, from the AMD 60 through the air-permeable conveyor belt 220 positioned in the second opening.

In some embodiments, the AMD 60 is positioned proximate to and/or below the air-permeable conveyor belt 220 and is configured to pull air from an external environment (e.g., ambient air, waste heated air from a power generation source, air pulled from flaring of lagoon gases, heat from other combustion sources, natural gas, or propane, etc.) and force this air through the air-permeable conveyor belt 220, such that a flow of air contacts the extruded waste product 10 on the upper surface of the air-permeable conveyor belt 220. The extruder 300, the air-permeable conveyor belt 220, and the AMD 60 can be powered by one or more electric motors or other suitable power source capable of providing sufficient power to each such device. In some embodiments, the one or more electric motors are controlled by a computerized controller configured to simultaneously control each of the one or more electric motors, such that each of the extruder 300, air-permeable conveyor belt 220, and/or AMD 60 are configured for simultaneous operation.

The system 100, 101 is configured such that the waste product 10 is transported along the air-permeable conveyor belt 220 through which air is forced by the AMD 60, with the waste product being exposed to the air flow for a period long enough to achieve a desired reduction in moisture content, which can be an intermediate moisture content between the moisture content of the unprocessed waste product and the moisture content of the dried waste product. As such, the system 100, 101 is configured to monitor (e.g., using an appropriate sensor) the moisture content of the ambient air, which can be measured using dry bulb temperature, wet bulb temperature, relative humidity, dew point, and the like, and can vary the amount of waste product 10 deposited on the air-permeable conveyor belt 220 by the extruder 300, the transit speed of the waste product 10 along the air-permeable conveyor belt 220, as well as the speed of the AMD 60 to vary the amount of air passing through the openings in the air-permeable conveyor belt 220. That is, at the starting point of the system 100, 101 (e.g., at the extruder 300) the waste product is deposited onto the air-permeable conveyor belt 220 in a substantially wet (e.g., having about 70% to about 95% moisture content) form. In some embodiments, the first conveyor 200 may be sufficiently long to allow for the waste product 10 to be dried to a sufficient moisture content without the use of other subsequent drying stages. However, in the example embodiment shown, the first conveyor 200 dries the waste product to an intermediate dried state, having a reduced moisture content from the wet waste product 10. As such, according to the example embodiments disclosed herein, subsequent drying stages are carried out (e.g., on/at second conveyor 400) to produce a substantially dry (e.g., about 5% to about 20%, inclusive, moisture content) waste product, which can be in a pelletized form.

Figure 3:
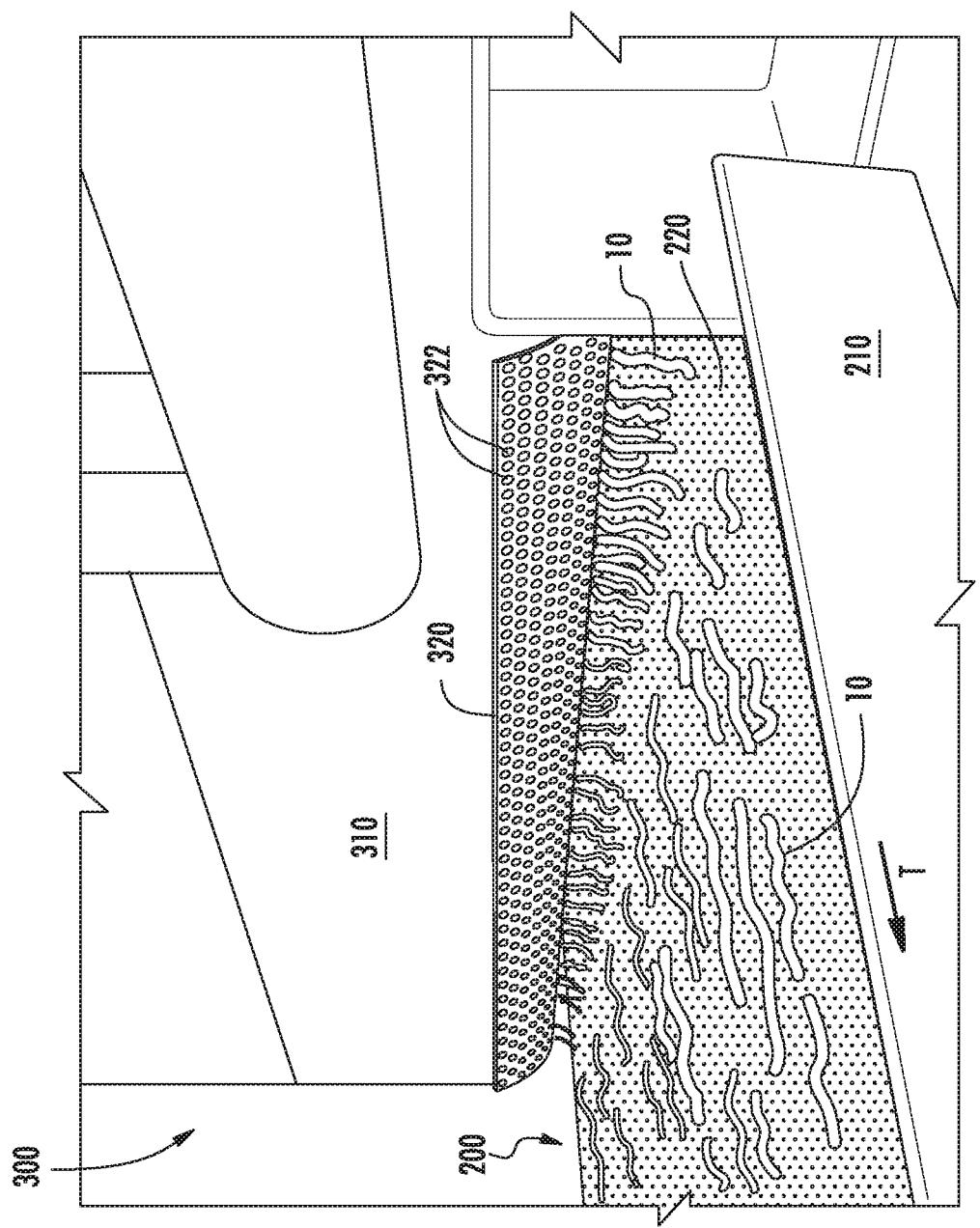
FIG. 3 is a perspective view of a waste product being extruded onto a first air-permeable conveyor belt of the system of either of FIGS. 1 and 2 for drying, to reduce the water content thereof.
Figure 4:
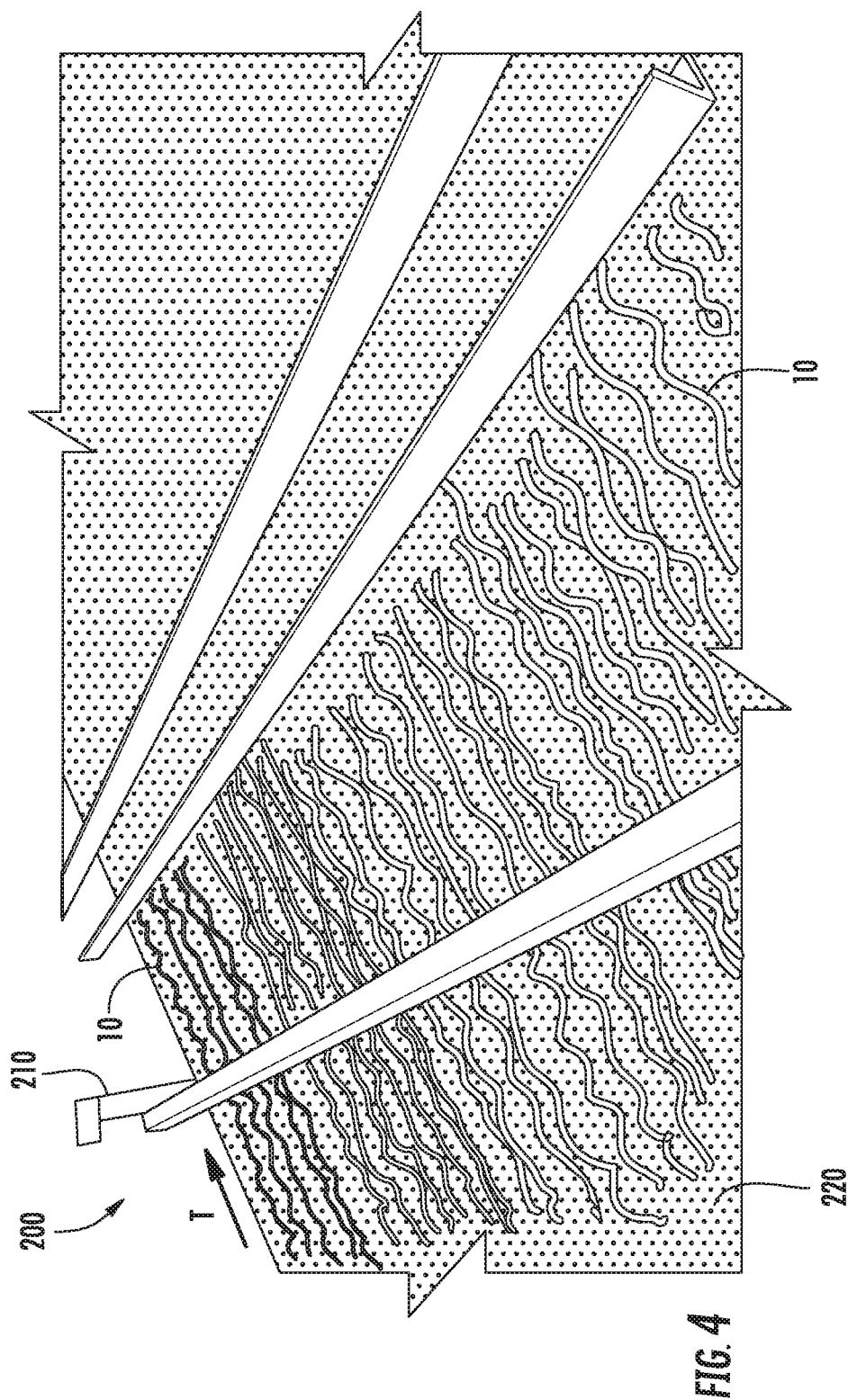
FIG. 4 is a perspective view of the extruded waste product shown in FIG. 3 being transported along the first air-permeable conveyor belt of the system of either of FIGS. 1 and 2.

The system 100, 101, as disclosed and shown herein, can, in some embodiments, comprise an extruder 300, an example embodiment of which is shown in FIG. 3. A bulk waste product having a moisture content of about 50% to about 95%, inclusive, is deposited into the hopper 310, of the extruder 300. Attached to the bottom edge of the hopper 310 is an extrusion die or plate 320, in which a plurality of holes 322 having a predefined diameter are formed. In some embodiments, the waste product 10 can be deposited in its wet state by a trough or any other device suitable for transferring the bulk waste product onto the air-permeable conveyor belt 220 of the first conveyor 200. In some embodiments, the hopper 310 is configured as a trough for receiving the unprocessed, or wet, waste product therein. While other types of extrusion devices or, indeed, depositing devices that are not based on extrusion at all, are contemplated, in the example embodiment shown, the extruder 300 has a rotatable member located within the hopper 310, the rotatable member having one or more paddles configured to rotate about an axis and force the wet waste product through the plurality of extrusion holes 322 formed in the extrusion plate 320. The bulk wet waste product 10 is extruded, as it passes through the plurality of extrusion holes 322, in tubular or noodle-like structures, which can be continuously dried by the air forced up through the air-permeable conveyor belts 220, 420 by the AMDs 60. In some embodiments, the extruder 300 may contain an auger or screw style impeller to drive the bulk wet waste product through the plurality of extrusion holes 322 formed in the extrusion plate 320. The extruder 300 can extend horizontally along one end of the first conveyor 200, extending over a portion, all, or substantially all (e.g., about 90%, to prevent waste product from being extruded over a portion of the air-permeable conveyor belt 220 from which the waste product may fall off or receive insufficient air flow) of the air-permeable conveyor belt 220. In some aspects, the extruder 300 is configured to continuously extrude the wet waste product from within the hopper 310 and deposit the extruded waste product substantially evenly over the air-permeable conveyor belt 220.

Figure 5:
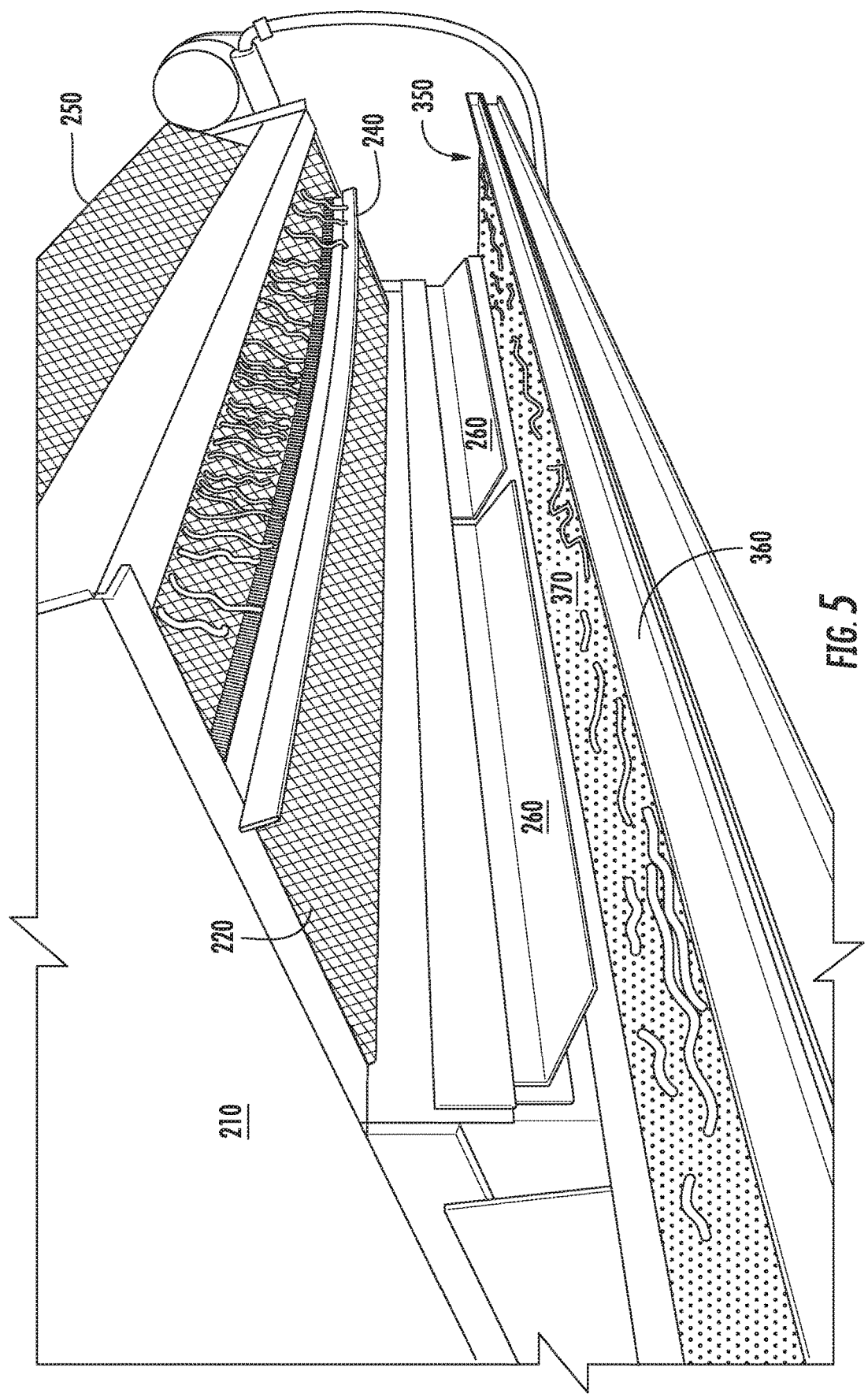
FIG. 5 is a perspective view of the extruded waste product being transferred, after a first stage of drying has been completed, from the first air-permeable conveyor belt onto a transport conveyor, which can transport the waste transport to a second air-permeable conveyor belt of the system of either of FIGS. 1 and 2.

As noted elsewhere herein, it is provided that such waste drying systems can comprise only a single stage of drying, in which case the transport conveyor 350 and the second conveyor 400 can be omitted. However, in the example embodiments shown in FIGS. 1 and 2, the systems 100, 101, comprise a first drying stage, comprising the first conveyor 200, as described hereinabove, and a second drying stage comprising a second conveyor 400. A transport conveyor 350 is provided, the transport conveyor 350 being configured to transfer extruded waste product 10 from the first conveyor 200 to the second conveyor 400 in a partially dried state. In some embodiments, the transport conveyor 350 may be omitted and the partially dried waste product 10 is transferred directly from the first conveyor 200 onto the second conveyor 400. In some embodiments, the system 100, 101 can include a controller configured to simultaneously and independently control the first and second conveyors 200, 400 to coordinate a speed of the respective air-permeable conveyor belts 220, 420 thereof, as well as a velocity and/or mass flow rate of air flow from AMDs 60, of the first and second conveyors 200, 400, respectively. In some aspects, as shown in FIG. 5, the first conveyor 200 comprises a physical agitator 240 (e.g., a brush) that is held in contact with the surface of the air-permeable conveyor belt 220 after the transport direction of the air-permeable conveyor belt 220 has been reversed. The agitator 240 is configured to remove a partially dried waste product 10 from the air-permeable conveyor belt 220, such that the partially dried extruded waste product 10 accumulates on the belt 370 of the transport conveyor 350, on which the waste product is transported to the second conveyor 400.

The second conveyor 400 comprises one or more air-permeable conveyor belts 420 that are supported by a housing 410. The housing 410 is shown as being substantially flat (e.g., arranged in a plane substantially orthogonal to the ground surface and/or the gravity vector) in the example embodiment of FIGS. 1 and 2, so that the waste product 10 can transported at a height above the receptacle 500, such that the waste product 10 can be transferred between the second conveyor 400 and the receptacle 500 using gravity and physical agitation, if necessary, to remove the waste product 10 from the second conveyor 400. In the example embodiment shown, a feeder ramp is provided at the end of the second conveyor 400 to transport the dried waste product 10 to an opening in the receptacle for receiving the dried waste product 10. The air-permeable conveyor belt 420 defines a transport surface along which the waste product 10 is transported in the transport direction T, from the transport conveyor 350 to the receptacle 500.

The air-permeable conveyor belt 420 can be of substantially any suitably porous material and construction. In some embodiments, the air-permeable conveyor belt 420 comprises a mesh, chain, interlocking, or otherwise linked material with sufficient rigidity to hold and transport the waste product 10 on an upper surface thereof, while being sufficiently flexible or bendable to track, or move, along a continuous revolving path. By way of example and not limitation, the air-permeable conveyor belt 420 can comprise a metal, metal alloy, plastic, composite material, woven material, combinations thereof, or any other suitable material. In some aspects, the air-permeable conveyor belt 420 comprises a plurality of perforations, holes, or openings extending from a lower surface of the air-permeable conveyor belt 420 to an upper surface of the air-permeable conveyor belt 420, wherein the perforations, holes, and/or openings are sufficiently large to allow airflow from one or more air moving devices (AMD) 60 (e.g., blowers or fans) of the second conveyor 400 to pass through the perforations, holes, and/or openings and contact the extruded waste product 10 being transported thereon.

The one or more AMDs 60 force air, generally in the direction indicated by the plurality of arrows A, through the openings in the air-permeable conveyor belt 420 on which the partially dried waste product 10 is deposited by the transport conveyor 350. This air flow further dries the partially dried extruded waste product 10 due to contact with this air flow as the waste product 10 is transported along the second conveyor 400, becoming further dried as it is transported therealong. As such, air flow is exhausted from within the housing 410 of the second conveyor 400 through the air-permeable conveyor belt 420 along substantially the entire length of the air-permeable conveyor belt 420, or at least from a point between where the waste product 10 is deposited on the air-permeable conveyor belt 200 by the extruder 300 and the end of the air-permeable conveyor belt 420, adjacent the transport conveyor 350. As used herein, while the air-permeable conveyor belt 420 is of a type of so-called endless conveyor, which is wrapped around, supported by, and/or driven by, a plurality of rollers (e.g., with or without gears attached thereto), the "ends" of the air-permeable conveyor belt 420 are considered to be the positions adjacent to the first and last rollers in the direction of travel T.

In some aspects of the system 100, 101, the housing 410 of the second conveyor 400 is in the form of a substantially enclosed housing, other than a majority of, or substantially all of, the surface along which the air-permeable conveyor belt 420 moves, which defines a first opening. The housing 410 has a second opening formed therein as well, the second opening being preferably located at the end thereof adjacent the transport conveyor 350 and away from the receptacle 500 to avoid any entrainment of the dried waste product 10 into the AMD 60 as the dried waste product 10 is deposited into the receptacle 500, however, the second opening and the AMD 60 may be located at any suitable location on the housing 410 to allow the AMD to be of sufficient size to generate a sufficient air flow to produce a desired moisture reduction of the waste product 10 as it is transported in the transport direction T. The AMD 60 may be mounted internal to, external from, or partially internal and partially external to the housing 410 and may advantageously be substantially sealed against the second opening to reduce air flow leakages therethrough. The surface along which the air-permeable conveyor belt 420 moves is positioned within the first opening and the housing 410 is configured to direct an air flow, designated in FIG. 2 by the arrows A, from the AMD 60 through the air-permeable conveyor belt 420 positioned in the second opening.

In some embodiments, the AMD 60 is positioned proximate to and/or below the air-permeable conveyor belt 420 and is configured to pull air from an external environment (e.g., ambient air, waste heated air from a power generation source, air pulled from flaring of lagoon gases, heat from other combustion sources, natural gas, or propane, etc.) and force this air through the air-permeable conveyor belt 420, such that a flow of air contacts the extruded waste product 10 on the upper surface of the air-permeable conveyor belt 420. The extruder 300, the air-permeable conveyor belt 420, and the AMD 60 can be powered by one or more electric motors or other suitable power source capable of providing sufficient power to each such device. In some embodiments, the one or more electric motors are controlled by a computerized controller configured to simultaneously control each of the one or more electric motors, such that each of the extruder 300, air-permeable conveyor belt 420, and/or AMD 60 are configured for simultaneous operation.

The system 100, 101 is configured such that the waste product 10 is transported along the air-permeable conveyor belt 420 through which air is forced by the AMD 60, with the partially dried waste product 10 being exposed to the air flow for a period long enough to achieve a desired further reduction in moisture content, which can advantageously be between about 5% and about 20% moisture content, inclusive. As such, the system 100, 101 is configured to monitor (e.g., using an appropriate sensor) the moisture content of the ambient air, which can be measured using dry bulb temperature, wet bulb temperature, relative humidity, dew point, and the like, and can vary the amount of waste product 10 deposited on the air-permeable conveyor belt 420 by the transport conveyor 350, the transit speed of the waste product 10 along the air-permeable conveyor belt 420, as well as the speed of the AMD 60 to vary the amount of air passing through the openings in the air-permeable conveyor belt 420. That is, the waste product 10 is deposited onto the air-permeable conveyor belt 420 in a partially dried state (e.g., having a moisture content of less than 60%, less than 50%, less than 40%, or less than 30%).

In some embodiments, the air-permeable conveyor belt 420 of the second conveyor 400 is configured to advance at a slower rate of speed than the air-permeable conveyor belt 220 of the first conveyor 200, whereby the partially dried extruded waste product 10 accumulates on the air-permeable conveyor belt 420 of the second conveyor 400 at a depth that is greater (e.g., thicker) than the depth at which the wet waste product 10 is deposited on the first conveyor 200.

Figure 6:
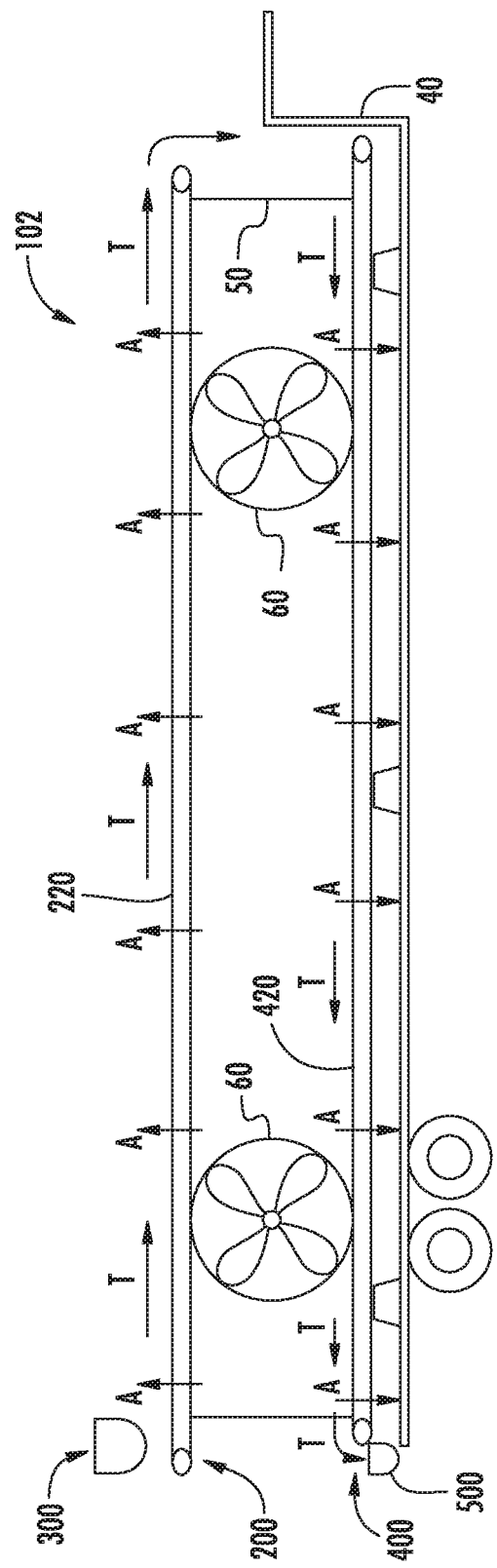
FIG. 6 is a schematic side view of a second example embodiment of a portable system for drying a waste product to reduce the water content thereof.
Figure 7:
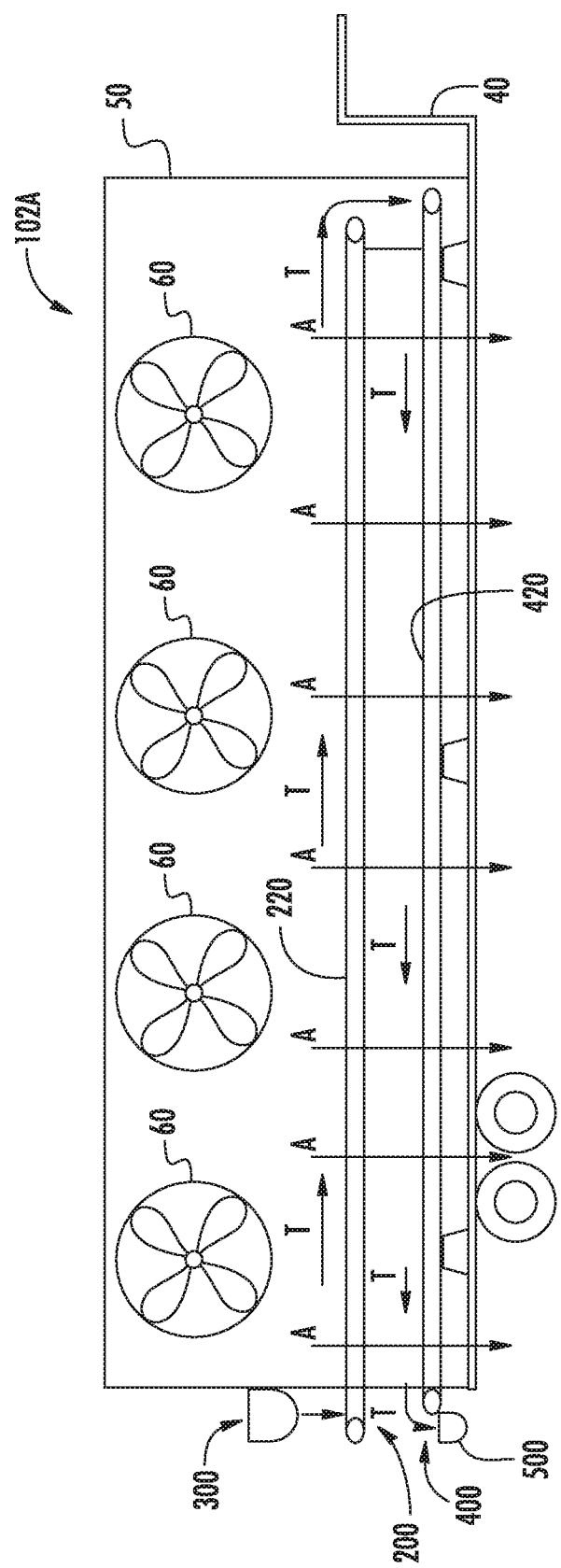
FIG. 7 is a schematic side view of an alternate example embodiment of the portable drying system shown in FIG. 6.

FIGS. 6 and 7 show further example embodiments of mobile waste drying systems, generally designated 102 and 102A, respectively. The systems 102, 102A are mobile and/or transportable (e.g., along a public roadway) to allow the mobile systems 102, 102A to be moved from one location to another rather than requiring assembly and disassembly of such systems at each location at which waste product is to be processed, or rather than transporting the waste product itself in its wet (e.g., unprocessed) state. Such mobile systems 102, 102A are advantageous because they can be moved to a site of need (e.g., proximate to a waste lagoon, concentrated animal feeding operation (CAFO), or other site in need of waste disposal/processing). In some aspects, such transportable or mobile systems 102, 102A can comprise similar components and design features as in the example embodiments of the systems 100, 101 discussed herein and shown in FIGS. 1-5, but such mobile systems 102, 102A are configured to make the entire system transportable.

In the example embodiments shown in FIGS. 6 and 7, which are respective side views of mobile waste drying systems 102, 102A, the mobile systems 102, 102A comprise a series of conveyors, for example a first conveyor, generally designated 200, and a second conveyor, generally designated 400, that are configured to transport a waste product over an enclosure, generally designated 50, into which a plurality of air moving devices (AMDs) 60 blow or suction air to create a high pressure region inside of the enclosure 50. The enclosure 50 has openings at the top and bottom surfaces thereof, in and/or over which the first and second conveyors 200, 400 are arranged so that air that is blown into the enclosure 50 by the AMDs 60 exhausts from the enclosure 50 through the air-permeable conveyor belts 220, 420 to dry the waste product being transported thereon as each respective air-permeable conveyor belt 220, 420 advances within the enclosure 50 in the direction of travel indicated by the arrow T. The direction of the air exhausting from the enclosure 50 through the air-permeable conveyor belts 220, 420 is indicated by the arrow A. Except as disclosed herein specifically regarding the mobile system 102, the air-permeable conveyor belts 220, 420 in the mobile system 102 are made and operate in the substantially the same manner as the air-permeable conveyor belts 220, 420 as described in the systems 100, 101 of FIGS. 1-5.

In the system 102 of FIG. 6, the first conveyor 200 is a first exit path for air being blown into the enclosure 50, while the second conveyor 400 is a second exit path for air being blown into the enclosure 50. Thus, the first conveyor 200 is located vertically above a level of the AMDs 60, while the second conveyor 400 is located vertically below a level of the AMDs 60. As such, the air flows over the waste product being transported along the first and second conveyors 200, 400 in what can be referred to herein as a parallel arrangement. As such, assuming the impedance to air flow is equivalent through the first and second conveyors 200, 400, of the total amount of air that is blown by the AMDs 60 into the enclosure 50, only about half of that total air flow will pass over the waste product on the first and second conveyors 200, 400, respectively. In the system 102A of FIG. 7, however, the first and second conveyors 200, 400 are both located vertically below a level of the AMDs 60, such that the enclosure 50 only has a single exit path for air blown into the enclosure 50, such that all, or substantially all (e.g., about 70%, about 80%, or about 90%) of air flow blown into the enclosure 50 by the AMDs 60 passes over the waste product being transported along the first and second conveyors 200, 400 sequentially. It is contemplated that such sequential air flow is advantageous in improving drying efficiency, allowing reduced energy consumption by the AMDs 60, faster processing time, and/or reduction in size of the first and second conveyors 200, 400 and/or enclosure 50. The arrangement of the first and second conveyors 200, 400 shown in the system 102A is merely exemplary and the first and second conveyors 200, 400 can be arranged in any order and position relative to the AMDs 60 and/or the enclosure 50 without deviating from the scope of the subject matter disclosed herein.

Mobile system 102 is configured such that waste product is transported along a path of conveyors (e.g., first and second conveyors 200, 400) through which air is forced, with the waste product being transported along the path of conveyors for a sufficient distance and/or time to produce a substantially dry (e.g., having a moisture content of about 5% to about 20%, inclusive) waste product, which can be produced, for example, in a pelletized form. As was disclosed in the system 100, 101, a substantially wet (e.g., having about 70% to about 95% moisture, inclusive) waste product is provided and, after passing along the length of the path of conveyors at a designated speed with a designated air flow passing through the air-permeable conveyor belt belts 220, 420 to impinge upon the waste product to a final collection point, a substantially dry, or substantially evenly dried, (e.g., having about 5% to about 20%) waste product is produced.

As shown in FIG. 6, the mobile system 102 comprises an extruder 300, which is substantially similar and operates substantially similarly to the extruder 300 of the systems 100, 101 shown in FIGS. 1-5. The extruder 300 is configured to extrude a wet waste product into an extruded waste product having a moisture content of about 50% to about 95%, inclusive. In some embodiments, the mobile system 102 is configured as a towable system (e.g., on a trailer) capable of being towed by a motorized vehicle or machine along, for example, a public roadway. By way of example and not limitation, such a mobile system 102 can be assembled on a trailer or towable platform having a length of about 20 feet to about 50 feet, inclusive, and a width of about 8 feet to about 12 feet, inclusive, or about 46 feet long and about 10 feet wide. In an alternate embodiment, such a mobile system 102 could be configured to be self-propelled on a vehicular platform suitable for transport on a public roadway. In some embodiments, the mobile system 102, can comprise tank for receiving the waste product in the wet form. The extruder 300 of the mobile system 102 is substantially similar to the extruder 300 shown in FIG. 3 and reference is made herein to the description accompanying FIG. 3 for further details as to the extruder 300 of the mobile system 102. It is further noted that the system 103 shown in FIGS. 8-10 and described elsewhere herein, can also be constructed as a mobile system as shown in FIG. 6 without deviating from the scope of the subject matter disclosed herein.

In some embodiments, the air-permeable conveyor belts 220, 420 of the mobile system 102 can comprise a mesh, chain, interlocking, or otherwise linked material with sufficient rigidity to hold and transport the extruded waste product on an upper surface thereof, while being sufficiently flexible or bendable to move and/or track along a continuous, uninterrupted, and/or endless revolving path. By way of example and not limitation, the one or more perforated conveyor belts can comprise a metal, metal alloy, plastic, composite material or any other suitable material. In some aspects, the air-permeable conveyor belts 220, 420 comprise a plurality of perforations, holes, and/or openings extending from a lower surface of the air-permeable conveyor belt 220, 420 in which such perforations, holes, and/or openings are formed, to an upper surface of such air-permeable conveyor belt 220, 420. It is advantageous for the perforations, holes, and/or openings of the air-permeable conveyor belts 220, 420 to be of a sufficiently large size to allow air blown into the enclosure 50 by the AMDs 60 to pass through the perforations, holes, and/or openings and to contact and/or impinge upon the extruded waste product transported thereon.

In some embodiments, AMDs 60 of the mobile system 102 are positioned proximate to (e.g., below and/or above) the air-permeable conveyor belts 220, 420, the AMDs 60 being configured to pull ambient air from an external environment and force the air into the enclosure 50 and to exhaust from the enclosure 50 through one of the air-permeable conveyor belts 220, 420 such that a flow of air comes into contact with, and/or impinges on, the waste product on the upper surface of one of the air-permeable conveyor belts 220, 420. In some embodiments, one or more of the AMDs 60 are mounted in the walls of enclosure 50, such that air blown into the enclosure 50 by the AMDs 60 is forced out through the upper and lower air-permeable conveyor belts 220, 420 of the first and second conveyors, respectively. As shown in the example embodiment of FIG. 6, the first conveyor 200 is positioned above the enclosure 50, or on the top side of the enclosure 50, with the second conveyor 400 being positioned below the enclosure 50, or on a bottom side of the enclosure 50, with the AMDs 60 mounted in the side walls of the enclosure and being arranged so as to blow air into, or suction air out of, the enclosure in a direction that is substantially orthogonal to direction of transport T of the waste product along the air-permeable conveyor belts 220, 420 of the first and second conveyors 200, 400.

In the example embodiment shown in FIG. 6, it is advantageous for the extruder 300, the first and second conveyors 200, 400, and/or the AMDs 60, are powered by one or more electric motors or other suitable power source sufficient to provide mechanical power to each, the one or more electric motors being controlled by a computerized controller configured to simultaneously control each of the one or more electric motors, such that each of the extruder 300, the first and second conveyors 200, 400, and/or the AMDs 60 are capable of simultaneous operation.

In some embodiments, the mobile system 102 disclosed herein can be said to comprise a first drying stage comprising the first conveyor 200 and a second drying stage comprising the second conveyor 400. A controller can be included and configured to simultaneously and independently control the first and second drying stages to coordinate a speed of the air-permeable conveyor belts 220, 420 of the first and second conveyors 200, 400, respectively, and a velocity of air flow from each of the AMDs 60. In some embodiments, the air-permeable conveyor belt 420 of the second conveyor 400 is configured to advance at a slower rate of speed (e.g., in the direction of the arrow T) than the air-permeable conveyor belt 220 of the first conveyor 200, such that the partially dried waste product is transferred from the first conveyor 200 onto the second conveyor 400 such that the partially dried waste product accumulates on the second conveyor 400 at a depth that is thicker than the depth of the waste product on the first conveyor 200.

Figure 8:
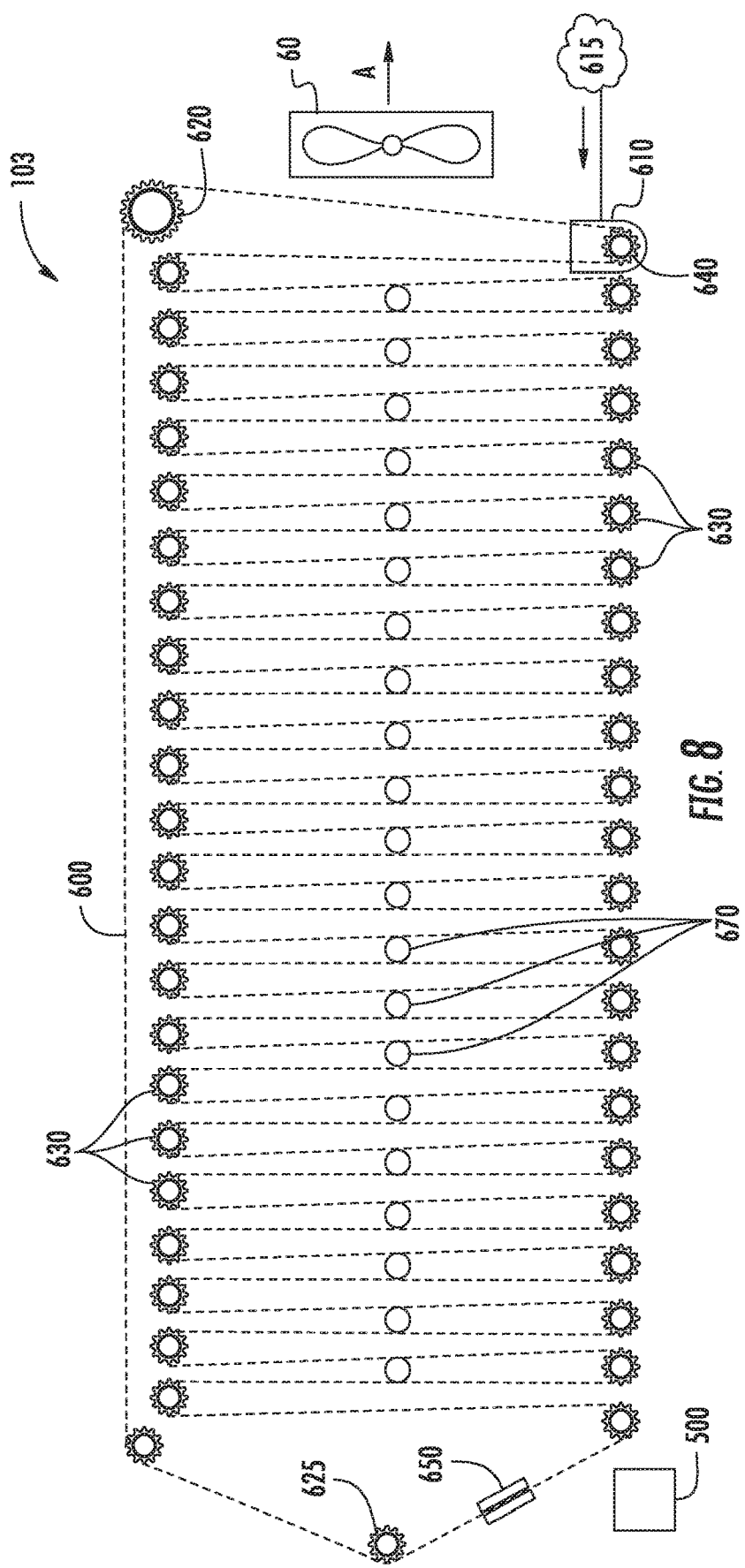
FIG. 8 is a schematic side view of a third example embodiment of a system for drying a waste product to reduce the water content thereof.
Figure 9:
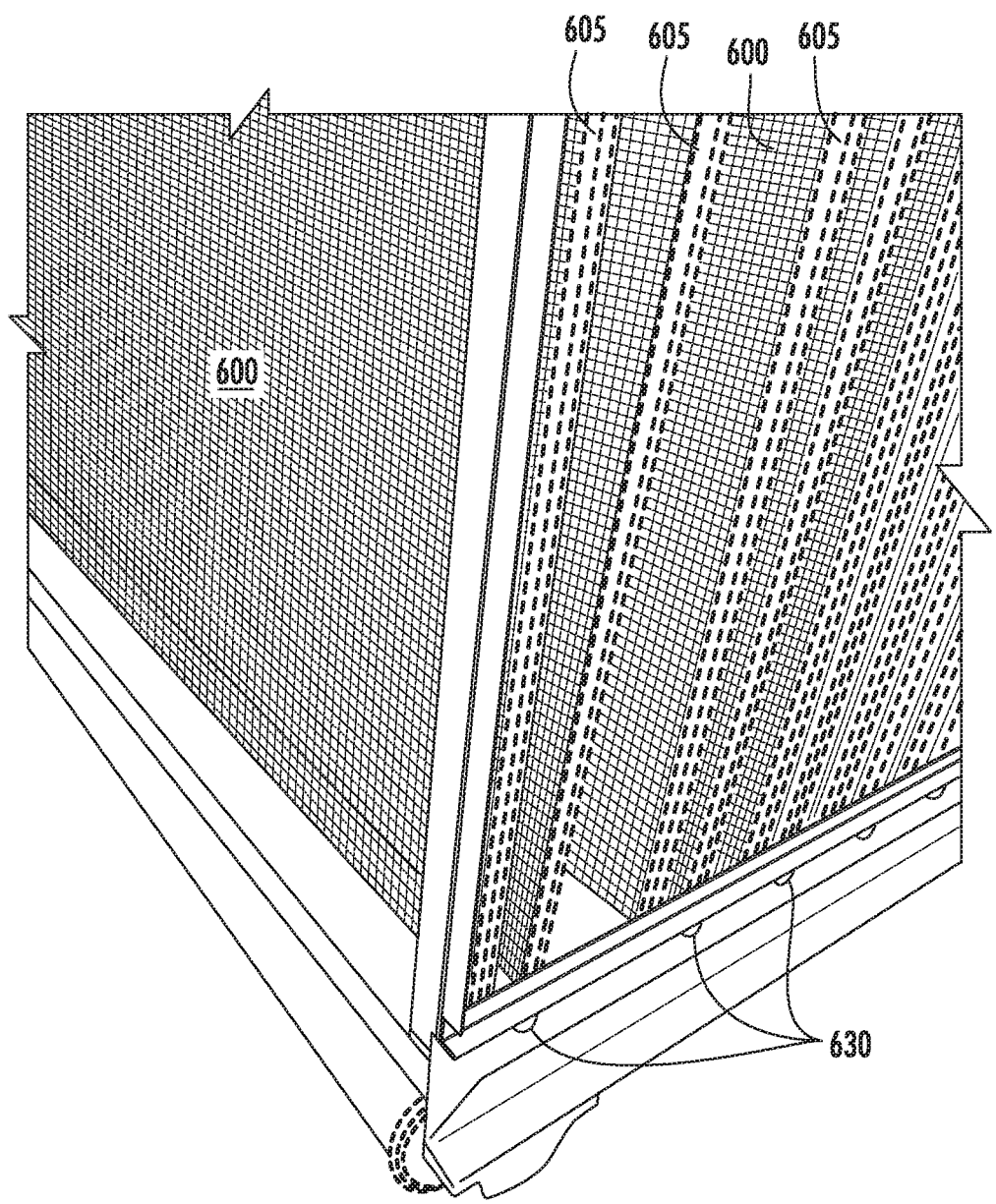
FIG. 9 is a perspective view of a portion of the third example embodiment of the system of FIG. 8.
Figure 10:
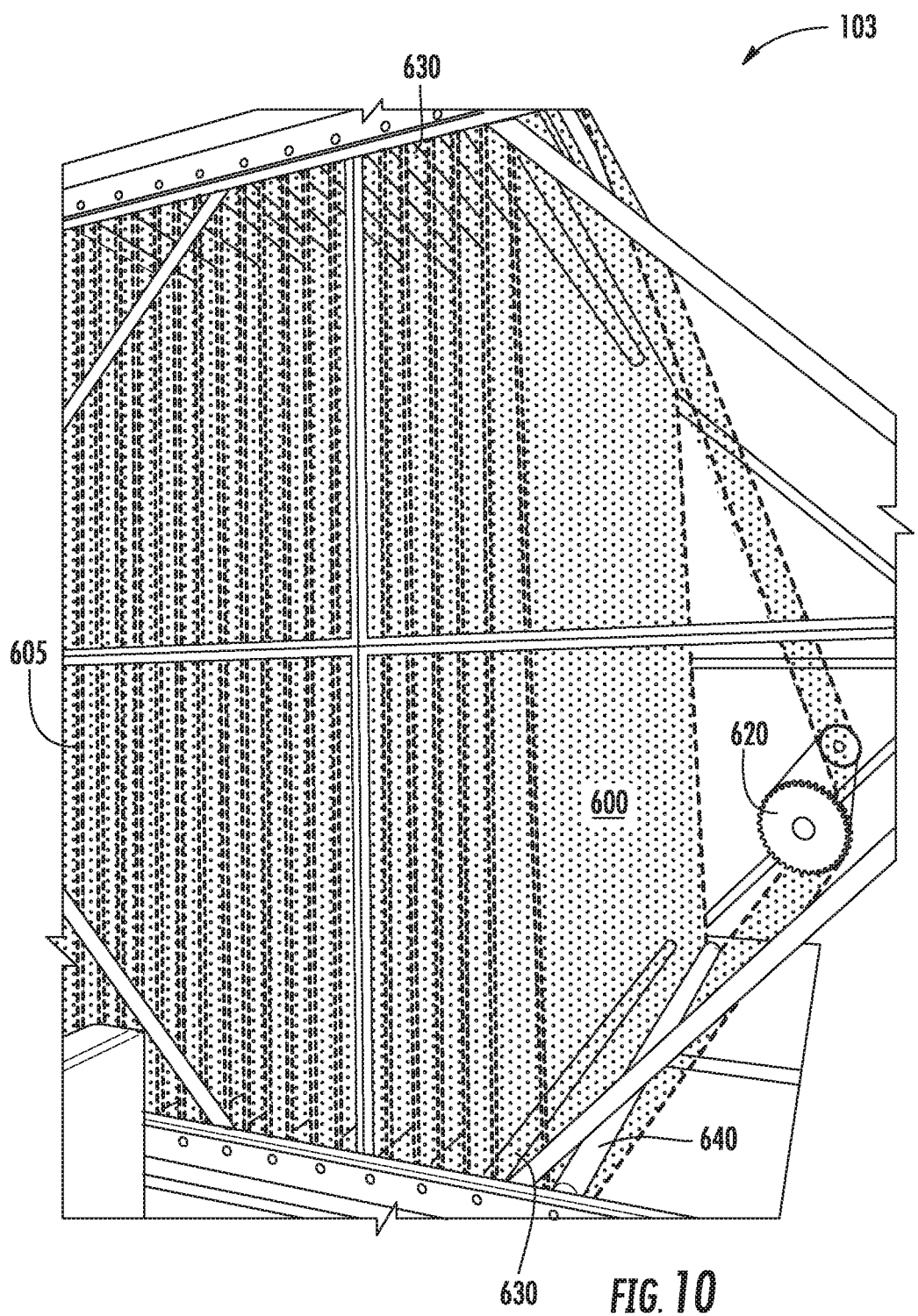
FIG. 10 is a perspective view of another portion of the third example embodiment of the system of FIG. 8.

The waste drying system, generally designated 103 shown in FIGS. 8-10 is configured to dry a more dilute waste product, for example, a waste product that comprises only between 8 to 12%, inclusive, solids, with the remainder being aqueous materials. Such dilute waste products can be extracted from the bottom of a waste lagoon. Such dilute waste products can be dried on the system 103, which comprises a single and uninterrupted belt 600 arranged in a serpentine manner about a series of idler rollers 630 and/or driven rollers 620, such that the belt 600 is looped upon itself in the horizontal direction, but without the layers of the belt 600 forming the looped arrangement being spaced apart and prevented from touching each other. Unlike in the systems 100-102 disclosed elsewhere herein, the system 103 is operable without the need for an extruder due to the comparatively high water content (e.g., about 88% to about 92% water) of the dilute waste product being dried by system 103. Such dilute waste product can be applied to the belt 600 and dried using air blown and/or forced through each of the looped portions of the belt 600 by one or more AMDs 660, which can be, for example and without limitation, a blower and/or a fan. Upon completion of the drying process, the system 103 produces a waste product that is in the form of a flake, nodule, dust, or powder, which can be collected for further processing as needed, including by forming pellets to facilitate ease of handling and storage.

The system 103 of FIGS. 8-10 comprises a chain 605 attached to at least the lateral edges of the belt 600, which chain 605 can be, for example and without limitation, a roller chain. In some embodiments, the chain 605 comprises an attachment, referred to in the art as an A1 attachment. In some embodiments, every link in the chain 605 has an A1 attachment, which is a convenient place to make an attachment between the chain and the belt 600. The belt 600 is attached to the chain 605 so that the chain 605 and the belt 600 move through the system simultaneously and/or at the same speed. One or more tensioner rollers 625 are provided in the system 103, each tensioner roller 625 being configured to exert a tension force on the chains 605 attached thereto and, accordingly, to the belt 600. Through the use of such tensioner rollers 625, a proper amount of tension can be maintained on the chain 605 and the belt 600 as the chain 605 and belt 600 rotate and/or move through the system 103 about the driven roller(s) 620, the idler roller(s) 630, and the tensioner roller(s) 625 to reduce any slack being present that would otherwise induce the chain 605 and/or the belt 600 to contact each other as they rotate and/or move through the system 103. It is advantageous to provide geared sprockets on the ends of one or more of the driven roller(s) 630, the idler roller(s) 630, and/or the tensioner roller(s) 625 that have a plurality of teeth arranged circumferentially thereabout, the teeth being configured to interface with the links of the chain 605 to prevent any slippage between the chain 605 and/or belt 600 and the driven roller(s) 630, the idler roller(s) 630, and/or the tensioner roller(s) 625.

In some embodiments, the belt 600 comprises a plastic mesh-like material comprising perforations on a desired grid size, such as, but not limited to, a half-inch grid size. In some embodiments, grid sizes are chosen based on a combination of allowing air permeability and having a sufficient surface area to support (e.g., via adhesion thereto) a desired amount of the dilute waste product, including lagoon sludge. If the grid size is too fine, there is an increased incidence of the holes in the mesh-like material becoming occluded or blocked. However, if the grid perforations are too large, there is excessive free space and the dilute waste produce may be unable to release all the moisture that the air can carry, thereby causing the drying process to be inefficient. Thus, in some embodiments, grid perforation size selection must be balanced between permeability and drying.

In some embodiments, the chain 605 and/or belt 600 are passed into the dilute waste product, which is provided in a trough or pan 610. The dilute waste product can be provided in the trough 610 substantially continuously from a source 615, which can be, for example, a waste lagoon. A valve and/or fill sensor can e used to control the flow of the dilute waste product into the trough 610. The dilute waste product can be applied to the belt using one or more rollers 640 within, or adjacent to, the trough 610. In some embodiments, a pair of rollers 640 can be mated together so that the belt 600 is drawn therethrough to apply the dilute waste product to the belt 600. In some embodiments, the rollers 640 are of a substantially similar type to those used in painting applications and are covered (e.g., immersed) in the dilute waste product in the trough 610. Thus, in some embodiments, the presently disclosed methods and system 103 comprises pulling the belt 600 about one roller 640 and/or between a pair of mated rollers 640. In a mated configuration, the bottom roller 640 coats the bottom side of the belt 600 and also transfers the dilute waste product to the top roller 640, which then coats the top side of the belt 600. Such a mated roller 640 arrangement can be advantageous in that it provides the opportunity for the dilute waste product to be attached on both sides of the belt 600. Thus, in some embodiments, in effect, the belt 600 is being applied (e.g., in the manner of painting) on both sides with the dilute waste product. Indeed, in some embodiments, the dilute waste product may have a consistency that is substantially similar to that of a paint suitable for application to a wall or other surface using a roller.

The system 103 includes the trough 610, through which the belt 600 travels to receive the dilute waste product from the trough 610. The application of the dilute waste product onto the belt 600 is facilitated by wrapping the belt 600 around one or more rollers 640 that can be disposed proximate to, or in, the trough 640 so as to effectively paint the dilute waste product from the trough 610 onto the belt 600 so as to facilitate even distribution of dilute waste product over the grid cells of the belt 600. In mated roller configuration embodiments, the belt 600 passes between first and second rollers 640 so as to sandwich the belt 600 between the rollers 640. In some embodiments, the rollers 640 are adapted to not immerse the chain 605 into the dilute waste product, which can be advantageous for increasing service life or the chain 605. The rollers 640 can provide an even coating on both sides of the belt 600.

In some embodiments, the belt 600 passes up and down vertically from a base position to a top position over a series of idler rollers 630 which include sprocket mountings at the ends thereof that interact with the chain 605 attached to the belt 600. The AMD 660 is disposed at one end of the system to provide a flow of air across the loops of the belt 600. In some embodiments, the air flow gains humidity as it is pulled in the direction of the fan. In some embodiments, the AMD 660 can be arranged on the opposite end of the system 103, such that the AMD 660 blows air across the loops of the belt 600 instead of pulling air across the loops of the belt 600 in the example illustrated configuration.

In order to facilitate modularity of the unit and transport of the system 103, the system 103 includes a frame that supports each of the drive roller(s) 620, the idler rollers 630, and the application roller 640. In some embodiments a spacer roller 670 is provided at various points along the path of the belt 600 to facilitate smooth operation of the conveyor belt about the drive and idler rollers 620, 630 and also to prevent contact between adjacent loops of the belt 600.

The system 103 is advantageous in that very short drying intervals are provided. The drying times are short because the amount of time that the belt 600 and the dilute waste product applied thereto is exposed to flowing air is increased due to the looped configuration. As such, it is advantageous to extend the interaction between the air and the dilute waste product to promote adequately reduced moisture levels thereof. This increased exposure to the flow of air further enhances energy efficiency and increases the evaporative capacity of the flow of air through the system 103. Also, the dilute waste product can be provided to the trough 610 straight from a source 615 (e.g., the lagoon) without adding any sort of flocculant. Further, in some embodiments, a counter flow approach for heat is applied, in which heat flow is introduced in the opposite direction in which the dried product is transported. For example, temperature can be monitored to an equilibrium point and then the conveyor belt can be moved forward to change the temperature and the evaporation equilibrium. After having been dried to a desired moisture content (e.g., between about 5% to about 20%, inclusive), the dry waste product is removed using a physical agitator (e.g., brush 650) at the end of the system 103 opposite the side of the system 103 in which the belt 600 has the dilute waste product applied thereto. The dried waste product is collected in the form of particles for subsequent use, as discussed elsewhere herein.

In some embodiments, to address possible concerns related to particles of the dried waste product being drawn into the AMD 660, a cyclone arrangement can be employed to avoid the loss of the dried waste product. In some embodiments, springs are provided in the mounting of the belt 600 on the frame to provide sufficient tension to the belt 600 to ensure smooth operation of the belt 600. In some embodiments, the system 103 can operate 24 hours a day in good weather, which can include dry air (e.g., not in rainy weather or during times of high humidity). Weather monitoring can be employed to control operation of the system 103, such that the system 103 is deactivated automatically when rain or humidity readings above a preset threshold are detected. In some states, such as North Carolina, it is envisioned that it might be desirable to operate the system 103 18 to 24 hours a day.

In some embodiments, the trough 605 can be loaded via connecting a source 615 (e.g., a tank) to the trough 610 and a flow of the dilute waste product between the source 615 and the trough 610 is controlled via a valve that can include a level sensor or float switch. Thus, the source 615 can be connected to the trough 610 and the system 103 can be allowed to run substantially unsupervised.

The frame-based configuration of the system 103 shown and described in relation to the example embodiment of FIGS. 8-10 can facilitate the streamlining of the footprint of the system 103, such as for use in a mobile embodiment as described elsewhere herein. Also, multiple systems 103 can be provided in a particular situation if the situation is urgent. Thus, in some aspects of this embodiment, air contacts the dilute waste product on the belt 600 substantially constantly as the belt 600 moves from one side of the system 103 to another, while the roller-based configuration is used to apply the dilute waste product to the belt 600, as opposed to an extruder-based configuration as disclosed in the first two example embodiments of systems 100-102. In some embodiments, the belt 600 can comprise a mesh rate range from quarter-inch mesh to two-inch mesh. Indeed, the combination of fan capability and mesh and thickness of the belt 600 can be adapted based on the particular conditions of the dilute waste product and for each particular implementation.

The belt 600 and/or the one or more AMDs 660 are powered by one or more electric motors or other suitable power source sufficient to provide power to each, the one or more electric motors being configured for control by a computerized controller configured to simultaneously control each of the one or more electric motors such that each of the belt 600 and/or the one or more AMDs 660 are capable of simultaneous operation.

Also disclosed herein are methods of processing and drying a waste product, and the resulting products. In some embodiments, methods of processing and drying a waste product comprise providing a waste product in a wet state and a drying system, as disclosed elsewhere herein. In some embodiments, the waste product is dried using the drying system. In some aspects, the waste product can comprise, for example but not limited to, lagoon sludge, swine waste, poultry litter, dairy waste, manure, and/or other animal waste.

In some aspects, a waste product to be dried can have a relatively high moisture content (e.g., 95% or more). In some embodiments, a bulking agent is added prior to drying or extrusion and drying of the waste product. However, embodiments are provided where this step may be omitted. Thus, in some aspects, methods disclosed herein can further comprise adding a bulking agent to the waste product before processing, the bulking agent comprising previously dried waste product, agricultural waste, tobacco processing waste, wood manufacturing residue waste, poultry/broiler litter, and combinations thereof.

Using the methods disclosed herein, and the systems and devices for doing the same, can result in a dried extruded waste product having a moisture content of about 5% to about 20%, inclusive. Such dry waste products can be pelletized and can comprise one or more waste products selected from swine waste, poultry waste, dairy waste, tobacco processing waste, wood manufacturing residue waste, lagoon sludge, lagoon digestate, cotton gin trash, food waste, and any combinations thereof, the dry pelletized waste product having a moisture content of about 5% to about 20%, inclusive. In some aspects, the dry waste product is configured for use as an energy source, combustible fuel, and/or fertilizer.

It will be understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A waste drying system, the system comprising:
    a trough comprising:
        a hopper configured to receive a bulk waste product; and
        an extruder configured to extrude the bulk waste product in a form of an extruded waste product that is suitable for convective drying, wherein the trough defines a first end of the system;
    a housing comprising a first opening, which is at a boundary of the housing with an external environment comprising ambient air, and a second opening;
    one or more conveyors having an air-permeable conveyor belt, each conveyor being positioned in the second opening and configured to receive the extruded waste product from the trough for transport along a path from the first end of the system to a second end of the system, wherein the second end of the system is at an opposite end of the conveyors from the first end of the system; and
    one or more air moving devices (AMDs) mounted in the first opening and configured to pull the ambient air from the external environment into the housing, at the first opening, and to exhaust the ambient air from the housing through the air-permeable conveyor belt, at the second opening, and across the extruded waste product while being transported on the air-permeable conveyor belt along the path from the first end of the system to the second end of the system;
    wherein the system is configured to transform the extruded waste product into a dried waste product having a moisture content of about 5% to about 20%, inclusive, without use of any heat source for heating the ambient air during transport of the extruded waste product from the first end of the system to the second end of the system, wherein the one or more conveyors comprise a first conveyor and second conveyor and the one or more AMDs comprise a first AMD and a second AMD, the system comprising:
        a first drying stage comprising the first conveyor and the first AMD;
        a second drying stage comprising the second conveyor and the second AMD; and
        a controller configured to simultaneously and independently control the first and second drying stages to coordinate a transport speed of the extruded waste product along the air-permeable conveyor belt of the first and second conveyors, respectively, as well as a flow of the ambient air produced by each of the first and second AMDs.

2. The system of claim 1, wherein:
    the extruder comprises a series of extrusion ports in at least one side of the hopper, and a rotatable member with one or more paddles configured to rotate about an axis and force the bulk waste product through the series of extrusion ports; or
    the extruder comprises a screw style in a tube.

3. The system of claim 2, wherein the extruder extends transversely along one end of the air-permeable conveyor belt of the first conveyor and extends substantially across a width thereof.

4. The system of claim 3, wherein the extruder is configured to continuously extrude the bulk waste product contained within the hopper onto the air-permeable conveyor belt of the first conveyor in a substantially even layer while the air-permeable conveyor belt of the first conveyor is in motion.

5. The system of claim 1, wherein the first conveyor comprises a physical agitator configured to remove the extruded waste product, in a form of a partially dried waste product, from the air-permeable conveyor belt of the first conveyor, such that the partially dried waste product accumulates on a transport belt configured to transport the partially dried waste product from the first conveyor to the second conveyor.

6. The system of claim 5, wherein the air-permeable conveyor belt of the second conveyor is configured to advance at a slower rate of speed than the air-permeable conveyor belt of the first conveyor, such that the partially dried extruded waste product accumulates on the air-permeable conveyor belt of the second conveyor at a thicker depth than a depth of the extruded waste product on the air-permeable conveyor belt of the first conveyor.

7. The system of claim 1, wherein each air-permeable conveyor belt comprises a mesh, metal, fabric, textile, chain, interlocking, or otherwise linked material with sufficient rigidity to hold and transport the extruded waste product on an upper surface thereof, while being sufficiently flexible or bendable to track along a continuous revolving path.

8. The system of claim 1, wherein each air-permeable conveyor belt comprises a metal, metal alloy, fabric or textile, plastic, and/or composite.

9. The system of claim 1, wherein each air-permeable conveyor belt comprises a plurality of perforations, holes, or openings extending from a lower surface of the air-permeable conveyor belt to an upper surface of the air-permeable conveyor belt, the perforations, holes, and/or openings being sufficiently large to allow air from the first AMD or the second AMD to pass through the perforations, holes, or openings and contact the extruded waste product transported thereon.

10. The system of claim 1, wherein the first AMD and the second AMD are positioned proximate to and/or below the air-permeable conveyor belts of the first conveyor and the second conveyor, respectively, wherein the first AMD and the second AMD are configured to produce a flow of the ambient air that contacts the extruded waste product on the surface of the respective air-permeable conveyor belt.

11. The system of claim 1, wherein the trough, the air-permeable conveyor belts of the first conveyor and the second conveyor, and the first AMD and the second AMD are powered by one or more electric motors configured to provide sufficient power to each, wherein the one or more electric motors are controlled by the controller configured to simultaneously control each of the one or more electric motors such that each of the trough, the air-permeable conveyor belts of the first conveyor and the second conveyor, and the first AMD and the second AMD are configured for simultaneous operation.

12. The system of claim 1, wherein the housing is configured to direct a flow of the ambient air from the first AMD and the second AMD in the first opening through the respective air-permeable conveyor belts positioned in the second opening.

13. The system of claim 1, comprising a receptacle at the second end of the system, wherein the receptacle is configured to collect the extruded waste product in a form of a dried waste product.

14. A method of processing and drying a waste product, the method comprising:
 providing a waste drying system according to claim 1;
 providing the bulk waste product into the hopper of the trough;
 extruding, using the extruder, the bulk waste product, in a form of an extruded waste product, over the air-permeable conveyor belt of the first conveyor;
 transporting the extruded waste product along the air-permeable conveyor belt of the first conveyor;
 passing, via the first AMD, the ambient air from the external environment through the air-permeable conveyor belt of the first conveyor while the extruded waste product is being transported along the air-permeable conveyor belt of the first conveyor;
 transporting the extruded waste product from the air-permeable conveyor belt of the first conveyor to the air-permeable conveyor belt of the second conveyor;
 passing, via the second AMD, the ambient air from the external environment through the air-permeable conveyor belt of the second conveyor while the extruded waste product is being transported along the air-permeable conveyor belt of the second conveyor; and
 reducing a moisture content of the bulk waste product to produce a dried waste product.

15. The method of claim 14, wherein the bulk waste product comprises lagoon sludge, swine waste, poultry litter, dairy waste, manure, and/or other animal waste.

16. The method of claim 14, comprising, before providing the bulk waste product into the trough, adding a bulking agent to the bulk waste product, wherein the bulking agent comprises one or more of previously dried waste product, agricultural waste, tobacco processing waste, wood manufacturing residue waste, poultry/broiler litter, and/or combinations thereof.

17. The method of claim 14, wherein the dried waste product comprises a moisture content of about 5% to about 20%, inclusive.

18. A waste drying system, the system comprising:
 a trough configured to receive a bulk waste product and to dispense the bulk waste product in a form suitable for convective drying, wherein the trough defines a first end of the system;
 a first drying stage comprising:
  a first housing comprising a first opening, which is at a boundary of the first housing with an external environment comprising ambient air, and a second opening;
  a first conveyor having an air-permeable conveyor belt, the first conveyor being positioned in the second opening of the first housing and configured to receive the bulk waste product from the trough for transport along a length of the first conveyor, away from the first end of the system; and
  a first air moving device (AMD) mounted in the first opening of the first housing and configured to pull the ambient air from the external environment into the first housing, at the first opening of the first housing, and to exhaust the ambient air from the first housing through the air-permeable conveyor belt of the first conveyor, at the second opening of the first housing, and across the bulk waste product while being transported on the air-permeable conveyor belt along the length of the first conveyor;
  wherein the first drying stage is configured to transform the bulk waste product into a partially dried waste product;
 a second drying stage comprising:
  a second housing comprising a first opening, which is at a boundary of the second housing with the external environment comprising ambient air, and a second opening;
  a second conveyor having an air-permeable conveyor belt, the second conveyor being positioned in the second opening of the second housing and configured to receive the partially dried waste product from the first conveyor and transport the partially dried waste product along a length of the second conveyor, towards a second end of the system, wherein the second end of the system is at an end of the second conveyor that is furthest from the first end of the system; and
  a second air moving device (AMD) mounted in the first opening of the second housing and configured to pull the ambient air from the external environment into the second housing, at the first opening of the second housing, and to exhaust the ambient air from the second housing through the air-permeable conveyor belt of the second conveyor, at the second opening of the second housing, and across the partially dried waste product while being transported on the air-permeable conveyor belt along the length of the second conveyor;
  wherein the second drying stage is configured to transform the partially dried waste product into a dried waste product; and
 a controller configured to simultaneously and independently control the first and second drying stages to coordinate a transport speed of the bulk waste product along the air-permeable conveyor belt of the first conveyor and of the partially dried waste product along the air-permeable conveyor belt of the second conveyor, respectively, as well as a flow of the ambient air produced by each of the first and second AMDs,
 wherein the system is configured to transform the bulk waste product into the dried waste product, which has a moisture content of about 5% to about 20%, inclusive, without use of any heat source for heating the ambient air during transport of the waste product through the first and second drying stages.

19. The system of claim 18, wherein the first conveyor comprises a physical agitator configured to remove the partially dried waste product from the air-permeable conveyor belt of the first conveyor, such that the partially dried waste product accumulates on a transport belt configured to transport the partially dried waste product from the first conveyor to the second conveyor.

20. The system of claim 19, wherein the air-permeable conveyor belt of the second conveyor is configured to advance at a slower rate of speed than the air-permeable conveyor belt of the first conveyor, such that the partially dried extruded waste product accumulates on the air-permeable conveyor belt of the second conveyor at a thicker depth than a depth of the bulk waste product on the air-permeable conveyor belt of the first conveyor.

* * * * *